US011358887B2

(12) United States Patent
Zhang et al.

(10) Patent No.: US 11,358,887 B2
(45) Date of Patent: Jun. 14, 2022

(54) TREATMENT SYSTEM FOR PMIDA WASTEWATER

(71) Applicant: NANJING YANCHANG REACTION TECHNOLOGY RESEARCH INSTITUTE CO., LTD., Nanjing (CN)

(72) Inventors: Zhibing Zhang, Nanjing (CN); Zheng Zhou, Nanjing (CN); Feng Zhang, Nanjing (CN); Lei Li, Nanjing (CN); Weimin Meng, Nanjing (CN); Baorong Wang, Nanjing (CN); Gaodong Yang, Nanjing (CN); Huaxun Luo, Nanjing (CN); Guoqiang Yang, Nanjing (CN); Hongzhou Tian, Nanjing (CN); Yu Cao, Nanjing (CN)

(73) Assignee: NANJING YANCHANG REACTION TECHNOLOGY RESEARCH INSTITUTE CO., LTD., Nanjing (CN)

( * ) Notice: Subject to any disclaimer, the term of this patent is extended or adjusted under 35 U.S.C. 154(b) by 0 days.

(21) Appl. No.: 17/431,173

(22) PCT Filed: May 27, 2020

(86) PCT No.: PCT/CN2020/092670
§ 371 (c)(1),
(2) Date: Aug. 16, 2021

(87) PCT Pub. No.: WO2021/128726
PCT Pub. Date: Jul. 1, 2021

(65) Prior Publication Data
US 2022/0041478 A1 Feb. 10, 2022

(30) Foreign Application Priority Data

Dec. 23, 2019 (CN) .......................... 201911333992.9

(51) Int. Cl.
*C02F 1/72* (2006.01)
*C02F 1/02* (2006.01)
(Continued)

(52) U.S. Cl.
CPC ................. *C02F 1/727* (2013.01); *C02F 1/02* (2013.01); *C02F 1/74* (2013.01); *C02F 2101/30* (2013.01);
(Continued)

(58) Field of Classification Search
None
See application file for complete search history.

(56) References Cited

U.S. PATENT DOCUMENTS 5,614,087 A * 3/1997 Le ........................ B01J 19/0073
210/180
6,190,564 B1 * 2/2001 Lehmann .............. C02F 11/086
210/110
2005/0171390 A1 * 8/2005 Felch ....................... A62D 3/20
568/959

FOREIGN PATENT DOCUMENTS

CN 101746910 A * 6/2010
CN 206219347 U 6/2017
(Continued)

OTHER PUBLICATIONS

Machine translation of CN-110316808-A, pp. 1-10. (Year: 2019).*
Machine translation of CN-101746910-A, pp. 1-7. (Year: 2010).*

*Primary Examiner* — Clare M Perrin

(57) ABSTRACT

The invention provides a treatment system and a treatment method for PMIDA high-salinity wastewater. The treatment system includes a booster pump, a water inlet-outlet heat exchanger, a water inlet heater and an oxidation reactor, and the water inlet-outlet heat exchanger is provided with a wastewater inlet, a wastewater outlet, an oxidized water inlet, and an oxidized water outlet. An oxidized water from
(Continued)

the oxidation reactor enters the water inlet-outlet heat exchanger through the oxidized water inlet, the oxidized water outlet is connected to an intermediate tank, the wastewater inlet is connected to the booster pump, and the wastewater outlet is connected to a wastewater heater. A micro-interface unit is disposed at the lower part in the oxidation reactor, for dispersing crushed gas into bubbles. A gas inlet is formed at a side wall of the oxidation reactor and is connected to the micro-interface unit through a pipeline.

6 Claims, 1 Drawing Sheet

(51) Int. Cl.
*C02F 1/74* (2006.01)
*C02F 101/36* (2006.01)
*C02F 101/38* (2006.01)
*C02F 103/36* (2006.01)
*C02F 101/30* (2006.01)

(52) U.S. Cl.
CPC ...... *C02F 2101/38* (2013.01); *C02F 2103/36* (2013.01)

(56) References Cited

FOREIGN PATENT DOCUMENTS

| | | | |
|---|---|---|---|
| CN | 110316808 A | * | 10/2019 |
| CN | 110316808 A | | 10/2019 |

* cited by examiner

TREATMENT SYSTEM FOR PMIDA WASTEWATER

BACKGROUND OF THE APPLICATION

Technical Filed

The invention relates to the technical field of N-(phosphonomethyl) iminodiacetic acid (PMIDA) high-salinity wastewater treatment, in particular, to a treatment system and a treatment method for PMIDA high-salinity wastewater.

DESCRIPTION OF RELATED ART

Wet Air oxidation (WAO) is to oxidize organic substances and reduced inorganic substances in wastewater into easily biochemical small molecular substances or to mineralize into harmless inorganic substances and inorganic salts by using air or oxygen as an oxidant under operation conditions of high temperature and high pressure. A wet air oxidation process does not produce HCl, dioxin, fly ash and other harmful substances, has low operation energy consumption, can heat the feed wastewater by utilizing the heat generated by the oxidation of organic substances in the wastewater, and even by-product steam, which is a very effective method for treating high concentration organic wastewater.

In the prior art, a basic process of wet air oxidation is as follows. After wastewater is pretreated, the wastewater is pressurized by a booster pump, heated by a heat exchange system, and enters a reactor together with heated high pressure air. The organic substances in the wastewater are subjected an oxidization reaction in the reactor with the oxygen in the air, and most of the organic substances are oxidized to $CO_2$, $H_2O$, or small molecular organic substances which are easily biochemical, and give off heat. A gas-liquid mixture composed of reacted wastewater and tail gas exchanges heat with feed wastewater by means of a heat exchange system, so as to cool the gas-liquid mixture and preheat the feed wastewater. The cooled gas-liquid mixture enters a separator for performing a gas-liquid separation, the separated oxidation wastewater enters a subsequent biochemical treatment or other sections, and the separated gas phase is discharged after treatment is completed and the standard is reached.

Wet air oxidation technology has been widely studied and implemented in engineering applications due to its advantages such as strong adaptability and good treatment effect, and specifically has the following advantages:

(a) high COD degradation efficiency: for high concentration organic wastewater, the COD degradation rate is above 80%, and some even exceeds 95%;

(b) strong adaptability: the wet air oxidation technology widely applicable for treating various types of high concentration organic wastewater;

(c) low operation cost: when the COD of the wastewater exceeds 15000 mg/L, the heat generated by the reaction can maintain the heat operation of the device, without additional heat supplement, and only need to provide power consumption such as a booster pump and an air compressor;

(d) no secondary pollution: no toxic harmful substances are produced in the reaction process, and the oxidation wastewater can enter a biochemical tank or other post-treatment section, the reaction tail gas can be discharged after simple treatments; and (e) small occupancy: a wet air oxidation device has a short process and a compact equipment layout.

The wet air oxidation technology also has some disadvantages, which limits its large-scale engineering applications, mainly as follows:

(a) high investment cost: due to high temperature and high pressure of the wet air oxidation device, the strong corrosiveness of the wastewater, and the sever requirements of equipment materials, one-time investment cost is high; and (b) high operation requirements: the device has high temperature and high pressure, which puts forward high requirements for safety management and operation.

In fact, in the engineering process of the wet air oxidation technology, the main reason for limiting the large-scale applications thereof is the operation conditions of high temperature and high pressure, thereby causing disadvantages such as high investment cost and high safety risks. The reasons for its high temperature and high pressure are, on the one hand, due to needs of reaction kinetics itself, on the other hand, due to low efficiency of gas-liquid mass transfer, higher pressure is required to complete "oxygen delivery". Specifically, current domestic and foreign wet air oxidation processes mainly have the following problems.

First, the reaction efficiency is low. The oxidation reactors are generally used as bubble reactors. A gas distribution pipe is disposed at the bottom of the reactor, an opening is disposed on the gas distribution pipe, and high-pressure gas bubbles enter the reactor by means of the opening on the gas distribution pipe. The gas bubbles have a relatively-large size, generally between 5 mm and 20 mm. On the one hand, large gas bubbles rise rapidly in the liquid phase, the contact time between air and wastewater in the reactor is short, and the mass transfer time is insufficient. On the other hand, due to the large diameter of gas bubbles, the interfacial area of a gas-liquid phase formed in the reactor is small, and the mass transfer space is insufficient. As a result, the reaction efficiency is low, and the reaction time is long.

Second, air consumption is high. Due to the short residence time of air in the liquid phase, a large amount of oxygen in the air is discharged from the reactor before participating in the reaction, so the reaction needs to provide excess air. Excessive air increases energy consumption of the air compressor and increases operation cost of the device. In addition, excessive air may reduce the volume utilization efficiency of the reactor, further increase the size and the rising speed of gas bubbles, increase the water vapor and VOCs entrained in the tail gas, which are not conducive to energy saving and consumption reduction during the reaction process.

In view of this, the present invention is proposed.

SUMMARY

A first objective of the present invention is to provide a treatment system for N-(phosphonomethyl) iminodiacetic acid (PMIDA) high-salinity wastewater. A micro-interface unit is disposed in an oxidation reactor of the treatment system. By adding the micro-interface unit, the mass transfer effect between two phases is improved, which has a high reaction efficiency. Gas bubbles may be broken into micron-scale gas bubbles, increasing an interfacial area of the gas-liquid phase, making the mass transfer space fully satisfied, increasing the residence time of air or oxygen in the liquid phase, and reducing air consumption. Even if the temperature and pressure need not be too high, the high reaction efficiency of the reaction itself can be ensured, a series of potential safety hazards caused by high temperature and high pressure can be avoided, being conducive to energy saving and consumption reduction of the reaction process, and having low cost.

A second objective of the present invention is to provide a treatment method for PMIDA high-salinity wastewater by using the described treatment system. The treatment method has simple operations, mild operation conditions and low energy consumption. In the treated PMIDA high-salinity wastewater, the harmful substance removal rate can reach 99%.

In order to achieve the above objectives of the present invention, the following technical solutions are specially adopted.

The invention provides a treatment system for PMIDA high-salinity wastewater. The treatment system includes a booster pump, a water inlet-outlet heat exchanger, a water inlet heater and an oxidation reactor which are connected in sequence, and the water inlet-outlet heat exchanger is provided with a wastewater inlet, a wastewater outlet, an oxidized water inlet, and an oxidized water outlet. An oxidized water from the oxidation reactor enters the water inlet-outlet heat exchanger through the oxidized water inlet, the oxidized water outlet is connected to an intermediate tank, the wastewater inlet is connected to the booster pump, and the wastewater outlet is connected to a wastewater heater. A micro-interface unit is disposed at a lower part in the oxidation reactor, for dispersing crushed gas into bubbles. A gas inlet is formed at a side wall of the oxidation reactor and is connected to the micro-interface unit through a pipeline. The wet air oxidation technology in the prior art generally has relatively high operation temperature and relatively high equipment requirements, which not only requires relatively high equipment requirements, high energy consumption and high cost, but also reduces operation safety. The equipment is susceptible to aging and damage, and has short residence time of oxygen in the reactor during reaction oxidation, which results in relatively high consumption of oxygen and increases the operation cost of the device. This reduces reaction efficiency and increases treatment cost, thereby having a more complicated operation process.

In view of the technological features of wet air oxidation itself, the present invention puts forward relatively sever requirements on a micro-interface unit that produce micro gas bubbles under the conditions of high temperature, high pressure and high corrosiveness, and the conditions of micron-scale bubbles are greatly different from those of millimeter-scale bubbles. In general, the present invention focuses on solving the following technical difficulties:

(a) researching and developing a micro-interface strengthening reactor for wet air oxidation, determining structural parameters and operating parameters of the reactor under micro-interface conditions; and being required to solve the problem of how to multiply the interface of the gas-liquid phase and improve the mass transfer efficiency and reaction efficiency in the process of micro-interface strengthening wet air oxidation;

(b) researching and developing a matching process scheme and a control method for a micro-interface strengthening wet air oxidation reactor, and enabling same to match a wet air oxidation reaction process under a micro-interface conditions, particularly solving a process scheme and a control process adjustment scheme under new conditions such as gas bubbles having small diameter, long residence time of gas phase, and high gas content ratio in the reactor and large interface of the gas-liquid phase, thereby realizing temperature and pressure reduction operation, and saving energy and reducing consumption; and (c) the gas-liquid mixed flow field of micro gas bubbles being different from the gas-liquid mixed flow field of millicentimeter gas bubbles, and being required to solve the problem that the gas-liquid distribution in the reactor under the micro gas bubbles is uniform and the gas-liquid deflection flow is prevented.

In order to sufficiently solve the above problem, the present invention reasonably plans and arranges the whole wastewater treatment system and the internal structure of the oxidation reactor. The specific solution includes:

(a) establishing oxygen transport kinetics of micro-interface strengthening wet air oxidation process, particularly establishing a model of the size and distribution of gas bubble diameter, a gas-liquid phase interface and a gas-liquid mass transfer rate of a PMIDA oxidation reaction process under micro-interface strengthening mass transfer conditions, and a macroscopic reaction dynamic model;

(b) on the basis of a micro-interface strengthening reaction technology, calculating the influence of system physical parameters, operation parameters and structural parameters of a reactor on an oxidation reaction, and calculating the reaction efficiency, heat balance and mass balance under new conditions to obtain energy consumption and material consumption data of the reaction process, thereby providing a design basis for a wet air oxidation reactor; and according to the described data, determining optimized structural parameters and process control parameters suitable for the micro-interface strengthening wet air oxidation reactor; and (c) combining with a flow field simulation tool, designing and manufacturing a cold-model experimental device for verifying and optimizing a flow field of a gas-liquid mixed flow of micro gas bubbles in a reactor, and guiding the design of an industrial reactor.

The present invention provides a treatment system specially for treating PMIDA high-salinity wastewater. By providing a micro-interface unit at the bottom of the oxidation reactor of the treatment system, air or oxygen entering the oxidation reactor is broken and dispersed into gas bubbles, which enables the gas bubbles and wastewater to form a gas-liquid emulsion, and increases the interfacial area between the gas and the wastewater, thereby improving reaction efficiency, increasing mass transfer effect of a reaction phase interface. After the mass transfer effect of the reaction phase is increased, high operation temperature and high operation pressure are not required, which can achieve the effect of low energy consumption and low operation cost.

Further, the micro-interface unit includes a first micro-interface generator arranged in an upper position and a second micro-interface generator arranged in a lower position. The first micro-interface generator introduces a wastewater recycled from the oxidation reactor, and the first micro-interface generator is connected to a gas guide pipe. A top end of the gas guide pipe extends out of a liquid surface of the oxidation reactor for recovering air or oxygen, and an end of the gas inlet extends into the second micro-interface generator.

Further, the first micro-interface generator is a hydraulic micro-interface generator. Through the entrainment power of wastewater, air or oxygen above the liquid surface of the oxidation reactor is entrained back through the pipeline, thereby increasing the mass transfer effect between gas and liquid phases, so as to fully recover the air or oxygen on the liquid surface.

Further, the second micro-interface generator is a pneumatic micro-interface generator. The air or oxygen from the air inlet enters the second micro-interface generator and is broken into micro-bubbles after being in contact with the wastewater, which improves the mass transfer effect. The air or oxygen from the air inlet is first compressed by the air compressor and is heated by the air heater, and then enters the second micro-interface generator.

Further, a connecting rod for mutually fixing the first micro-interface generator and the second micro-interface generator to each other is disposed between the first micro-interface generator and the second micro-interface generator. The connecting rod has a good reinforcement function to prevent the flow of liquid inside the oxidation reactor from impacting the micro-interface unit. Furthermore, the first micro-interface generator is fixed inside the oxidation reactor with a grid plate, and the second micro-interface generator is fixed inside the oxidation reactor by means of pipe reinforcement.

Those skilled in the art should understand that, the micro-interface generator used in the present invention is embodied in a prior patent of the present inventor. As in a CN patent with Patent Publication No. 106215730 A, the core of the micro-interface generator is breaking into gas bubbles. The principle of a gas bubble breaker is that the gas carried by the high-speed jet collide with each other, so that the bubbles are broken. An embodiment of a micro-interface generator is disclosed in the described patent with respect to the structure of the micro-interface generator, details are not described herein anymore. The connections between the micro-interface generator and the oxidation reactor and other devices include a connection structure and a connection position, is determined according to the structure of the micro-interface generator, and is not limited herein. The reaction mechanism and control method of the micro-interface generator are disclosed in another prior patent of the present inventor, that is, the CN patent with Patent Publication No. 107563051 B, and will not be repeated herein. Based on practical engineering requirements, factors such as the height, length, diameter and wastewater flow rate of the oxidation reactor in the present system can also be adjusted to achieve better air supply effect and improve the oxidation degradation rate.

In addition, in the solution of the present invention, the PMIDA high-salinity wastewater is heated by a wastewater heat exchanger and a wastewater heater, and then enters the oxidation reactor. Because the oxidation reaction needs to be carried out under high temperature and high pressure, it is necessary to pre-heat the PMIDA high-salinity wastewater. In addition, the temperature of the oxidized water reacted in the oxidation reactor is relatively high, in order to make full use of this part of heat, it can be introduced into the wastewater heat exchanger for heating the PMIDA high-salinity wastewater.

By adopting the micro-interface generator, the present invention has fully reduced the reaction temperature and the reaction pressure. The temperature of the oxidation reaction is controlled at 180-185° C., and a reaction pressure of the oxidation reaction is controlled at 4-4.5 MPa.

Further, an oxidation outlet is disposed at a top portion of the oxidation reactor, and the oxidation outlet is connected to the oxidized water inlet through a second pipeline.

Further, the oxidized water from the oxidation water outlet enters a vapor-liquid separation tank for vapor-liquid separation.

Further, the treatment system further comprises the intermediate tank, and the intermediate tank is connected to the vapor-liquid separation tank and is configured to collect the wastewater after oxidation treatment for performing a sequent salt removal treatment.

The oxidized water from the oxidized water outlet of the wastewater heat exchanger first undergoes gas-liquid separation, and the tail gas is directly recovered from the top of the gas-liquid separation tank, and the oxidized water is sent to the intermediate tank for a sequent salt removal treatment.

A pump can be disposed on the corresponding connecting pipelines in the treatment system of the present invention based on actual needs.

The treatment system for PMIDA high-salinity wastewater of the present invention has a high treatment capability. After being treated by the treatment system, it can be ensured that under a relatively low energy consumption condition, the treatment system has a relatively high treatment effect, and the removal rate of harmful substances can reach about 99%.

Furthermore, a treatment method for PMIDA high-salinity wastewater can also be provided in the present invention, which includes the following steps:

the PMIDA high-salinity wastewater entering an oxidation reactor after being heated, and introducing a compressed air or a compressed oxygen into the oxidation reactor to perform an oxidation reaction; and dispersing and breaking the compressed air or the compressed oxygen which enters the oxidation reactor by the micro-interface unit.

Further, a temperature of the oxidation reaction is 180-185° C., and a reaction pressure of the oxidation reaction is 4-4.5 MPa, or the reaction temperature is 182° C., and the reaction pressure is 4.2 MPa.

The treatment method for PMIDA high-salinity wastewater of the present invention has simple operation, mild operation conditions and low energy consumption, and has a 99% removal rate of harmful substances and COD in the treated PMIDA high-salinity wastewater, so as to reduce discharge of industrial wastes, which is environmentally friendly and is worth to be widely promoted and applied.

Compared with the prior art, the present invention has the following beneficial effects:

(1) The treatment system for PMIDA high-salinity wastewater of the present invention reduces the reaction pressure from 8 MPa to 4.2 MPa, reduces the reaction temperature from 210° C. to 182° C., and greatly reduces the severity of the device and equipment investment. The PMIDA wastewater has high corrosiveness in this condition, and zirconium material is used in high temperature parts of the device, which is expensive. Reducing the design pressure and temperature is very significant for reducing the investment cost of the device, and reducing the temperature and pressure also provides more options for selecting types of zirconium material instrument and a pump valve.

(2) By reducing the reaction pressure and temperature, the present invention also significantly saves the energy consumption of the compressor. During the wet air oxidation process, organic substances are oxidized to generate a large amount of heat, which can basically maintain the self-supply of heat during the operation of the device. The operation cost is mainly the energy consumption of the air compressor and the high pressure pump, and the air compressor occupies most of the energy consumption. Reducing the outlet pressure of the compressor significantly reduces the energy consumption of the compressor, and also reduces the compressor investment costs for a new device.

(3) In the wastewater treatment system of the present invention, gas bubbles in the reactor is broken into micro gas bubbles, which correspondingly reduces the rising speed of the gas bubbles, prolongs the residence time of the bubbles, improves the oxygen utilization rate, and reduces the operation load of the air compressor.

(4) After cost estimation of the wastewater treatment system of the present invention, a micro-interface strengthening technology is applied to wastewater wet air oxidation, which reduces equipment investment by about 20%, saves operation costs of about 15%, and has a positive significance for the application and promotion of wet air oxidation technology in high-salinity and high COD wastewater.

BRIEF DESCRIPTION OF DRAWINGS

By reading the detailed description of the preferred embodiments below, various other advantages and benefits will become clear to those of ordinary skill in the art. The drawings are only used for the purpose of illustrating the preferred embodiments, and are not considered as a limitation to the invention. Also, throughout the drawings, the same reference numerals are used to denote the same components. In the drawings.

DETAIL DESCRIPTION

Figure 1:
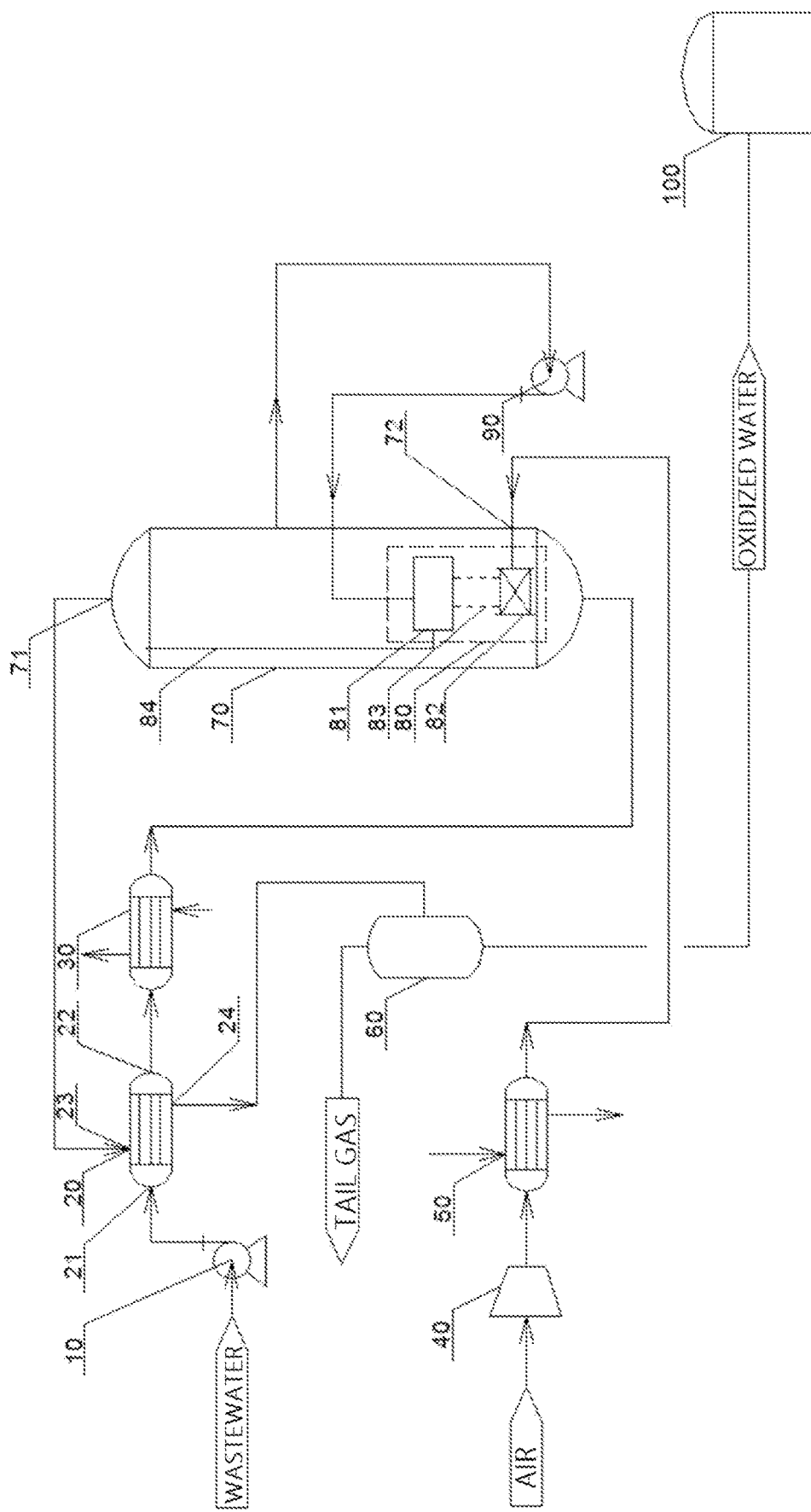
FIG. 1 is a structural diagram of a treatment system for PMIDA high-salinity wastewater according to an embodiment of the present invention.

In order to make the purpose and advantages of the invention clearer, the invention will be further described below in conjunction with the embodiments. It should be understood that the specific embodiments described here are only used to explain the invention, and are not used to limit the invention.

It should be understood that in the description of the invention, orientations or position relationships indicated by terms upper, lower, front, back, left, right, inside, outside and the like are orientations or position relationships are based on the direction or position relationship shown in the drawings, which is only for ease of description, rather than indicating or implying that the device or element must have a specific orientation, be constructed and operated in a specific orientation, and therefore cannot be understood as a limitation of the invention.

Further, it should also be noted that in the description of the invention, terms "mounting", "connected" and "connection" should be understood broadly, for example, may be fixed connection and also may be detachable connection or integral connection; may be mechanical connection and also may be electrical connection; and may be direct connection, also may be indirection connection through an intermediary, and also may be communication of interiors of two components. Those skilled in the art may understand the specific meaning of terms in the invention according to specific circumstance.

In order to explain the technical solutions of the present invention more clearly, specific embodiments are used for description below.

Embodiments

Referring to FIG. 1, a treatment system for PMIDA high-salinity wastewater according to an embodiment of the present invention, including a booster pump 10, a water inlet-outlet heat exchanger 20, a water inlet heater 30, and an oxidation reactor 70 which are connected in sequence.

A wastewater inlet 21, a wastewater outlet 22, an oxidation water inlet 23 and an oxidation water outlet 24 are disposed on the inlet-outlet heat exchanger 20. The oxidized water from the oxidation reactor enters the water inlet-outlet heat exchanger 20 by means of the oxidation water inlet 23. The oxidation water outlet 24 is connected to an intermediate tank 100, the wastewater inlet 21 is connected to the booster pump 10, and the wastewater outlet 22 is connected to a water inlet heater 30. In the water inlet-outlet heat exchanger 20, the oxidized water after the reaction of the oxidation reactor 70 exchanges heat with the PMIDA high-salinity wastewater to be treated, achieving the effect of fully utilizing the energy resource.

An oxidation outlet 71 is disposed at an upper portion of the oxidation reactor 70. The oxidized water from the oxidation outlet 71 enters the inlet-outlet heat exchanger 20 by means of the oxidation water inlet 23. A micro-interface unit 80 for dispersing broken gas into gas bubbles is disposed at the lower portion of the oxidation reactor 70. A gas inlet 72 is disposed on the side wall of the oxidation reactor 70, and the air inlet 72 is connected to the micro-interface unit 80 through a pipeline. An air compressor 40 is in communication with the air inlet 72, the air compressor 40 may be a centrifugal air compressor, and this type of compressors are inexpensive and convenient to use. Air or oxygen compressed by the air compressor 40 is first heated by the air heater 50, then enters the oxidation reactor 70, and enters the micro-interface unit 80 through the air inlet 72.

The micro-interface unit 80 includes a first micro-interface generator 81 arranged in a lower position and a second micro-interface generator 82 arranged in a lower position. The first micro-interface generator 81 introduces wastewater recycled from the oxidation reactor 70. The wastewater is preferably recycled by a circulation pump 90. The first micro-interface generator 81 is connected to a gas guide pipe 84. A top end of the gas guide pipe 84 extends out of a liquid surface of the oxidation reactor 70 for recovering air or oxygen, and the first micro-interface generator 81 is a liquid micro-interface generator, thereby realizing the entrainment of air or oxygen above the liquid surface in the oxidation reactor 70. The second micro-interface generator 82 is a pneumatic micro-interface generator, the end of the gas inlet disposed at the side wall of the oxidation reactor 70 extends into the second micro-interface generator 82. Air introduced from the air inlet 72 contacts wastewater in the second micro-interface generator 82 to increase the contact area of the gas-liquid phase, and breaks gas bubbles into micro gas bubbles to improve the mass transfer effect.

A connecting rod 83 for mutually fixing the first micro-interface generator 81 and the second micro-interface generator 82 to each other is disposed between the first micro-interface generator 81 and the second micro-interface generator 82. There are three connecting rods 83 provided symmetrically between the first micro-interface generator 81 and the second micro-interface generator 82.

In addition, the oxidized water from the oxidation water outlet 24 contains a part of oxygen. Therefore, gas-liquid separation is first performed in a gas-liquid separation tank 60, the tail gas is recovered from the top of the gas-liquid separation tank 60, the oxidized water is removed from the bottom of the gas-liquid separation tank 60, and is temporarily stored in the intermediate tank 100, and the water from the intermediate tank 100 continues to be subjected subsequent salt removal treatment.

In the above embodiment, the number of the micro-interface generators is not limited. In order to improve the effects of dispersion and mass transfer, additional micro-interface generators may also be provided. In particular, the installation position of the micro-interface generators is not limited, and the micro-interface generators may be externally provided or internally provided. When the micro-interface generators are internally provided, the micro-interface generators may also be installed on the side wall of a kettle in an opposite manner, so that micro gas bubbles from the outlet of the micro-interface generators are flushed.

In the above embodiment, the number of the pump bodies is not specifically required, and the pump bodies can be provided at corresponding positions based on actual needs.

In the following, the operation process and principle of the treatment system for PMIDA high-salinity wastewater of the present invention are briefly described.

The wastewater is pressurized by the booster pump 10, then passes through the water inlet-outlet heat exchanger 20 and the water inlet heater 30 in sequence for heat exchange, and enters the bottom of the oxidation reactor 70 after being subjected to heat exchange to the required reaction temperature. After being compressed and pressurized by the air compressor 40, air enters an air heater 50 for heating, and then enters the micro-interface unit 80 in the oxidation reactor 70 in two ways. The energy conversion is performed in the micro-interface unit 80 together with the wastewater recycled by the circulation pump 90, and the kinetic energy and pressure energy of the gas and liquid is converted into a bubble surface energy, such that a large number of tens to hundreds of microns of gas bubbles are generated and enter the bottom of the oxidation reactor 70, thereby producing a phase interfacial area in the reactor of greater than 8000 m2/m3 or more, greatly increasing the reaction rate.

The tail water and tail gas produced by the reaction exchange heat with wastewater by means of the inlet-outlet water heat exchanger 20 for recovering heat, and enter the gas-liquid separation tank 60 to perform gas-liquid separation after cooling. The tail water enters the subsequent treatment section, and the tail gas is discharged after treatment is completed and the standard is reached.

During the abovementioned process, the reaction temperature in the oxidation reactor 70 is 180-185° C., and the reaction pressure is 4-4.5 MPa. Preferably, the reaction temperature is 182° C., and the reaction pressure is 4.2 MPa.

The oxidized water after subjected oxidation reaction in the oxidation reactor 70 is returned from the top of the oxidation reactor 70 to the inlet-outlet heat exchanger 20 for heat exchange cooling treatment, and then is transported to the intermediate tank 100 for storage. The water from the intermediate tank 100 continues to be subjected to subsequent salt removal treatment so as to recover reusable products.

Each of the described process steps is repeated to allow smooth operation of the whole treatment system.

APPLICATION EXAMPLE

In Sichuan, an enterprise, specializing in the research and development and production of chemicals and pesticides, produce 600 tons of PMIDA mother liquor wastewater produced per day in the pesticide production process, the COD of inlet water is 31340 mg/L, the total salt is 22.7%, and the formaldehyde is 5936 mg/L. Wet air oxidation treatment is used for removing most of COD and formaldehyde, and the product enters a subsequent resource recycling process section.

According to the treatment effects of the conventional wet air oxidation technology, the relevant design requirements are proposed by the company, as shown in Table 1.

TABLE 1

Wet air oxidation design requirements of PMIDA mother liquor wastewater 1200 ton/day

| Name | Inlet Water | Outlet water |
|---|---|---|
| Temperature (° C.) | 210 | 220 |
| Pressure (MPa) | 8.0 | 7.9 |
| PH | 10 | 7 |
| Amount of Air (Nm³/d) |  | 108000 |
| Amount of wastewater (m³/d) | 637 | 637 |
| COD (mg/L) | 31340 | 6268 |
| Ammonia nitrogen (mg/L) | 220 | 1103 |
| Total phosphorus (mg/L) | 7246 | 7246 |
| Sodium chloride (mg/L) | 205273 | 205273 |
| Formaldehyde (mg/L) | 5936 | 297 |
| Phosphate (mg/L) | 21792 | 35463 |
| Formic acid (mg/L) | 11.5 | 11.5 |

By adopting the wastewater treatment system of the embodiment of the present invention, and calibration is performed after the device is stably operated for 72 hours, and the specific treatment results are shown in the following Table 2. It is found by means of tests that the temperature and pressure can be greatly reduced after the micro-interface reaction strengthening technology is used under the condition of reaching the design criteria.

TABLE 2

Effect comparison for the treatment system of the present invention and conventional wet air oxidization system

| | Process type | | |
|---|---|---|---|
| Technical index | Conventional wet air oxidization system | Treatment system of the present invention | Technology comparison for the treatment system of the present invention and the conventional wet air oxidization system |
| Treatment amount (t/d) | 637 | 885 | Increase by 39% |
| Reaction temperature (° C.) | 210 | 182 | Reduce by 28 |
| Reactant residence time (h) | 1 | 0.72 | Reduce by 28% |
| Reaction pressure (MPa) | 8 | 4.2 | Reduce by 3.8 |
| Interfacial area of unit reactor | ~75 | 3000 | Increase by about 39 times |
| Consumption amount of air (t/t) | 0.217 | 0.140 | Reduce by 35% |
| Reactor Treatment Strength (t/m³.h) | 1 | 1.39 | Increase by 39% |
| COD removal (%) | 80 | 91 | Increase by 13.8% |

TABLE 2-continued

Effect comparison for the treatment system of the present invention and conventional wet air oxidization system

| Technical index | Process type | | |
| --- | --- | --- | --- |
| | Conventional wet air oxidization system | Treatment system of the present invention | Technology comparison for the treatment system of the present invention and the conventional wet air oxidization system |
| Oxygen utilization rate in air, % | 55 | 85 | Increase by 30% |
| Total energy consumption of ton of product, kWh/t | 46 | 39 | Reduce by 15% |

By adopting the wastewater treatment system of the present invention, the following technical objects can be achieved:

(a) on the premise of reaching the designed water outlet indexes, the reaction pressure is reduced to not more than 4 MPa, the reaction temperature is 182° C., and the operation cost is reduced;

(b) the micro-interface strengthening technology is adopted, improving the oxygen utilization rate, and reducing the energy consumption of the air compressor by more than 10%; and (c) the temperature and pressure is reduced, reducing the severity of the device, and improving the intrinsic safety of the device, and providing guidance for reducing design temperature and pressure for later micro-interface strengthening wet air oxidation devices.

So far, the technical solution of the invention has been described in conjunction with the preferred embodiments shown in the drawings. However, it is easily understood by those skilled in the art that the protection scope of the invention is obviously not limited to these specific embodiments. Without departing from the principle of the invention, those skilled in the art can make equivalent changes or substitutions to the relevant technical features, which will fall into the protection scope of the invention.

The above are only preferred embodiments of the invention rather than limits to the invention. Those skilled in the art may make various modifications and changes to the invention. Any modification, equivalent replacement, improvement and the like made within the spirit and principle of the invention all should be included in the protection scope of the invention.

The invention claimed is:

1. A treatment system for N-(phosphonomethyl) iminodiacetic acid (PMIDA) wastewater, comprising: a booster pump, a water inlet-outlet heat exchanger, a water inlet heater, and an oxidation reactor which are connected in sequence, the water inlet-outlet heat exchanger being provided with a wastewater inlet, a wastewater outlet, an oxidized water inlet, and an oxidized water outlet;

wherein an oxidized water from the oxidation reactor enters the water inlet-outlet heat exchanger through the oxidized water inlet, the oxidized water outlet is connected to an intermediate tank, the wastewater inlet is connected to the booster pump, and the wastewater outlet is connected to the water inlet heater; and wherein a micro-interface unit is disposed at a lower portion inside the oxidation reactor, and is configured to break bubbles into micron-scale gas bubbles, a gas inlet is disposed at a side wall of the oxidation reactor, and the gas inlet is connected to the micro-interface unit through a pipeline;

wherein the micro-interface unit comprises a first micro-interface generator arranged in an upper position and a second micro-interface generator arranged in a lower position, the first micro-interface generator introduces a wastewater recycled from the oxidation reactor, the first micro-interface generator is connected to a gas guide pipe, a top end of the gas guide pipe extends out of a liquid surface of the oxidation reactor for recovering air or oxygen, and an end of the gas inlet extends into the second micro-interface generator;

wherein the first micro-interface generator is a hydraulic micro-interface generator, and through an entrainment power of the wastewater, air or oxygen above the liquid surface of the oxidation reactor is entrained back to the first micro-interface generator through the gas guide pipe;

wherein the second micro-interface generator is a pneumatic micro-interface generator, and air introduced from the gas inlet contacts the wastewater in the second micro-interface generator to increase a contact area of a gas-liquid phase.

2. The treatment system for PMIDA wastewater according to claim 1, wherein a connecting rod for mutually fixing the first micro-interface generator and the second micro-interface generator to each other is disposed between the first micro-interface generator and the second micro-interface generator.

3. The treatment system for PMIDA wastewater according to claim 1, wherein an oxidation outlet is disposed at a top portion of the oxidation reactor, and the oxidation outlet is connected to the oxidized water inlet through a second pipeline.

4. The treatment system for PMIDA wastewater according to claim 1, wherein the oxidized water from the oxidation water outlet enters a vapor-liquid separation tank for vapor-liquid separation.

5. The treatment system for PMIDA wastewater according to claim 4, wherein the treatment system further comprises the intermediate tank, and the intermediate tank is connected to the vapor-liquid separation tank and is configured to collect the wastewater after oxidation treatment for performing a sequential salt removal treatment.

6. The treatment system for PMIDA wastewater according to claim 1, wherein the first micro-interface generator is fixed inside the oxidation reactor with a grid plate, and the second micro-interface generator is fixed inside the oxidation reactor by means of pipe reinforcement.

\* \* \* \* \*